United States Patent [19]

Endo et al.

[11] Patent Number: 4,822,525

[45] Date of Patent: Apr. 18, 1989

[54] PROCESS FOR PREPARING A CARTRIDGE FOR DISPOSAL OF A RADIOACTIVE WASTE LIQUID

[75] Inventors: Noboru Endo; Yutaka Kikuchi, both of Tokyo; Kiichi Yamatsuta; Shoji Goto, both of Kanagawa, all of Japan

[73] Assignees: Doryokuro Kakunenryo Kaihatsu Jigyodan; Asahi Fiber Glass Company Limited, both of Tokyo, Japan

[21] Appl. No.: 26,197

[22] Filed: Mar. 16, 1987

[30] Foreign Application Priority Data

Mar. 25, 1986 [JP] Japan .............................. 61-066318

[51] Int. Cl.[4] ...................... G21F 9/16; C03C 25/02; C03B 19/09; C03B 20/00

[52] U.S. Cl. ...................................... 252/629; 65/3.1; 65/3.4; 65/18.1; 65/18.4; 65/60.1; 65/60.3; 65/60.5; 65/60.53; 264/56; 264/62; 501/35; 501/153; 501/154

[58] Field of Search ...................... 252/628, 629, 631; 65/2, 3.1, 3.2, 3.41, 12, 18.1, 60.5, 60.52, 60.53, 18.4, 30.1, 30.13, 30.14, 60.1, 60.3, 60.51; 428/378; 501/152, 153, 154, 155; 264/56, 62, 125

[56] References Cited

U.S. PATENT DOCUMENTS

| | | | |
|---|---|---|---|
| 2,083,132 | 6/1937 | Williams et al. | 428/391 |
| 3,027,274 | 3/1962 | Huntington et al. | 65/3.41 |
| 3,265,627 | 8/1966 | Clark et al. | 252/629 |
| 3,272,756 | 9/1966 | Kaser | 252/629 |
| 3,451,940 | 6/1969 | Stukenbrooker | 252/629 |
| 3,483,019 | 12/1969 | Youse | 65/3.43 |
| 4,330,628 | 5/1982 | Cockram et al. | 252/629 |
| 4,376,070 | 3/1983 | Pope et al. | 252/629 |
| 4,488,990 | 12/1984 | Yannopoulos | 252/629 |
| 4,500,600 | 2/1985 | Wong et al. | 428/391 |

FOREIGN PATENT DOCUMENTS

| | | | |
|---|---|---|---|
| 0073125 | 3/1983 | European Pat. Off. | 252/629 |
| 0102468 | 3/1984 | European Pat. Off. | 252/629 |
| 2485243 | 12/1981 | France | 252/629 |
| 4215519 | 8/1967 | Japan | 252/629 |
| 0058499 | 4/1983 | Japan | 252/629 |
| 0132699 | 8/1983 | Japan | 252/629 |
| 0045839 | 10/1985 | Japan | 252/629 |
| 0202398 | 10/1985 | Japan | 252/629 |
| 0244899 | 12/1985 | Japan | 252/629 |
| 1079200 | 4/1986 | Japan | 252/629 |
| 807014 | 1/1955 | United Kingdom . | |

OTHER PUBLICATIONS

Gayler, et al., The Retrification of High Level Radioactive Wastes Using Microwave Power, Conference on Microwave Power Symposium, Ottawa Canada, Jun. 1978, pp. 28–30.

Chemical Abstracts, Col. 103, 1985, pp. 540–541, Abstract No. 168540v, Columbus Ohio, U.S.

European Search Report Dated Dec. 10, 1987.

*Primary Examiner*—Howard J. Locker

*Attorney, Agent, or Firm*—Oblon, Fisher, Spivak, McClelland & Maier

[57] ABSTRACT

A process for preparing a cartridge for disposal of a radioactive waste liquid, which comprises filling glass fibers in a mold, heat-treating the fibers for partial fusion and molding them into a molded product of a predetermined shape, wherein at least one member selected from the group consisting of boric acid, silicic acid, lithium borate, lithium silicate, zinc borate, zinc silicate, an organic silane, a silica sol, an oil emulsion, and an alumina sol, is applied to the glass fibers or to the molded product.

8 Claims, 1 Drawing Sheet

PROCESS FOR PREPARING A CARTRIDGE FOR DISPOSAL OF A RADIOACTIVE WASTE LIQUID

The present invention relates to a process for preparing a cartridge for disposal of a radioactive waste liquid. The cartridge is useful for the disposal of a radioactive waste liquid in such a manner that it is impregnated with the radioactive waste liquid, followed by heat-melting and solidification into glass.

In the regeneration treatment at a regeneration plant of a used fuel from a nuclear reactor, a highly radioactive waste liquid containing uranium, transuranium elements and nuclear fission products, and nitric acid, is produced as a by-product. Under the circumstances, a technique for safely and efficiently disposing such a radioactive waste liquid, is desired.

Heretofore, for the treatment of such a radioactive waste liquid, a technique has been developed wherein the radioactive waste liquid is directly, or after being denitrated and concentrated into a slurry, mixed with a glass material, then the mixture is supplied into a high temperature glass melting furnace wherein the liquid component in the waste liquid is evaporated and the radioactive substances are melted into glass, and the molten glass is poured into and solidified in a container made of steel.

However, in such a conventional technique, the glass material was in the form of beads or powder, and a dust containing a substantial amount of radioactive substances, was likely to be generated when the waste liquid was vigorously boiled in the glass melting furnace, and such a dust was likely to be discharged together with the exhaust gas. For this reason, it was necessary to provide a dust-treating installation in the exhaust gas treating system, with considerably strict requirements. Further, it was likely that the piping lines were clogged by the dust. Furthermore, there was a possible danger that bricks in the furnace underwent cracking by thermal shock, and a part thereof fell off.

Under the circumstances, in recent years, it has been proposed to use glass fibers as the glass material. It is advantageous to use glass fibers in that the waste liquid is impregnated in spaces between glass fibers, and a dust generated during the melting operation, is trapped by the filtering effect of the glass fibers and prevented from scattering.

The present inventors have conducted extensive research to develop this technique for practical application, and have found it possible to obtain a cartridge for the disposal of a radioactive waste liquid, which is more suitable for the treatment of the radioactive waste liquid for glass solidification, by partially fusing the glass fibers and molding them into a block. A patent application (Japanese patent application No. 101902/1984) has been filed for an invention based on this discovery.

However, it has been found that the above-mentioned cartridge for the disposal of a radioactive waste liquid, has a problem that a dust of glass fibers is generated when the glass fibers are sintered, and the dust is likely to deposit to cause clogging of the cartridge supply system. Further, the strength of the cartridge varies to a substantial degree depending upon the sintering conditions, and it is difficult to obtain cartridges having constant or uniform strength.

It is an object of the present invention to provide a process for preparing a cartridge for disposal of a radioactive waste liquid, wherein glass fibers are partially fused and molded, whereby it is possible to prevent the generation of a dust of glass fibers and to obtain constant strength for cartridges.

The present invention provides a process for preparing a cartridge for disposal of a radioactive waste liquid, which comprises filling glass fibers in a mold, heat-treating the fibers for partial fusion and molding them into a molded product of a predetermined shape, wherein at least one member selected from the group consisting of boric acid, silicic acid, lithium borate, lithium silicate, zinc borate, zinc silicate, an organic silane, an oil emulsion, and an alumina sol, is applied to the glass fibers or to the molded product.

Now, the present invention will be described in detail with reference to the preferred embodiments.

In the accompanying drawings, FIG. 1 is a perspective view illustrating a step of applying an aqueous boric acid solution to glass fibers.

Figure 1:
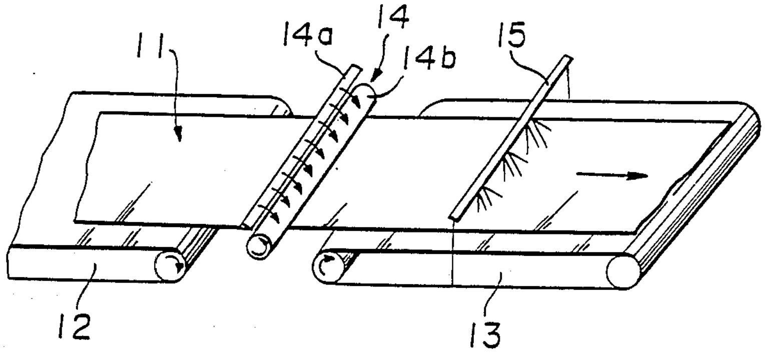

In the present invention, by the application of at least one member selected from the group consisting of boric acid, silicic acid, lithium borate, lithium silicate, zinc borate, zinc silicate, an organic silane, a silica sol, an oil emulsion and an alumina sol, such an inorganic acid, inorganic acid salt or organic substance, provides an adhesive effect or a coating film-forming effect, whereby the compression strength and impact strength of the cartridge is improved. As a result, the amount of the dust generated, decreases, and it is possible to prevent troubles caused by the dust.

Said at least one member is applied preferably in an amount of from 0.01 to 2% by weight, as solid content, relative to the glass fibers.

In the present invention, the inorganic acid or inorganic acid salt such as boric acid, silicic acid, lithium borate, lithium silicate, zinc borate or zinc silicate, or alumina sol, is a component constituting the glass fibers, and therefore can be added without modifying the final composition of glass. Usually, the glass fibers are composed essentially of 55 to 65% by weight of $SiO_2$, 2 to 6% by weight of $B_2O_3$, from 2 to 6% by weight of $Li_2O$, from 0 to 6% by weight of BaO, from 2 to 6% by weight of CaO, from 2 to 6% by weight of ZnO and from 2 to 8% by weight of $Al_2O_3$. In a particularly preferred example for the glass solidification of radioactive substances, the glass fibers are composed essentially of 60.2% by weight of $SiO_2$, 19.0% by weight of $B_2O_3$, 4.0% by weight of $Li_2O$, 4.0% by weight of BaO, 4.0% by weight of CaO, 4.0% by weight of ZnO and 4.8% by weight of $Al_2O_3$. The composition of the glass fibers of this type, is relatively strictly determined by its nature. When other components are added, it may happen that no adequate effects are obtainable. Such a possibility can be avoided by using the above-mentioned inorganic acid, inorganic acid salt or alumina sol, because such a material can be added without modifying the composition of the glass fibers. In a more preferred embodiment, the addition of the above-mentioned inorganic acid, inorganic aci salt or alumina sol is adjusted so that the final composition after the addition corresponds to the desired composition of glass fibers. The glass fibers prior to the addition may be composed essentially of 50 to 75% by weight of $Si0_2$, 0 to 15% by weight of $B_2O_3$, from 0 to 10% by weight of $Li_2O$, from 0 to 10% by weight of BaO, from 0 to 25% by weight of CaO, from 0 to 10% by weight of ZnO and from 0 to 15% by weight of $Al_2O_3$.

A boric acid gel or a silicic acid gel may also be employed as the above-mentioned inorganic acid or inorganic acid salt. Among the above-mentioned inorganic acids and acid salts, boric acid ($H_3BO_3$) is particularly preferred since it is most inexpensive and readily available.

The above-mentioned inorganic acid or inorganic acid salt may be added to the glass fibers, in the form of a solution or powder. Preferably, it is added in the form of a solution. When such an inorganic acid or acid salt is added in the form of a solution, the glass fibers may be dipped in such a solution, or such a solution may be spray-coated onto the glass fibers. The application of the solution of the inorganic acid or inorganic acid salt may be conducted during the fiber-forming step of the glass fibers, or before or after the molding of the fibers into a cartridge, or such different types of applications may be used in combination. With a view to prevention of the generation of a dust, it is preferred to apply the solution after the molding into a cartridge.

On the other hand, in the present invention, it is possible to employ an organic silane and an oil emulsion in addition to the above-mentioned inorganic acids, inorganic acid salts and alumina sol. As the organic silane, for example, a $\gamma$-alkylaminotriethoxysilane may be used. Likewise, as the oil emulsion, for example, an emulsified mineral oil may be used. By the application of the organic substance capable of imparting the wettability and slipping property to the cartridge itself, such as the organic silane or oil emulsion, during the fiber-forming step, or before or after the molding of the fibers into a cartridge, it is possible to substantially reduce the amount of a dust generated from the cartridge. The organic silane or oil emulsion is applied preferably in an amount of from 0.001 to 1% by weight. More preferably, the amount is from 0.01 to 0.1% by weight, from the view point of the economy and effects.

The glass fibers to be used in the present invention, may be short fibers or long fibers. However, the present invention is particularly suitable for short fibers. The average diameter of the glass fibers, is preferably from 8 to 18 $\mu$m. If the average diameter is less than 8 $\mu$m, it tends to be difficult to obtain a good water-absorbing property. On the other hand, if the average diameter exceeds 18 $\mu$m, the productivity in the spinning step tends to be poor, and the fusing points of the glass fibers one another tend to be less, whereby the dimensional stability tends to be poor.

The treating capacity of a cartridge is proportional to its weight. In order to increase the amount of the waste liquid to be treated per cartridge, it is therefore necessary to increase the density. In some cases, a product having a density as high as 280 kg/$m^3$ may be used. The product tends to be susceptible to cracking as the density increases, but cracking may be avoided by improving the manner of handling. The water absorbing property also decreases, but such a decrease does not adversely affect the present invention. Further, the waste liquid tends to hardly penetrate, as the density increases. This can be avoided to some extent by increasing the diameter of the glass fibers to the above-mentioned upper limit of 18 $\mu$m.

As shown in FIG. 1, glass fibers 11 are deposited on and transported by belt conveyors 12 and 13. During the transportation, an aqueous boric acid solution is applied to the glass fibers 11 by a hot dipping apparatus 14. This hot dipping apparatus 14 is designed so that the aqueous boric acid solution overflowing a supply tube **14*a* is applied to the glass fibers 11 by a roller 14*b*. As a separate means, a spray 15 may be employed to apply an aqueous boric acid solution to the glass fibers 11**. The concentration of the aqueous boric acid solution may be varied depending upon the temperature of water, and is preferably within a range of from 1 to 10% by weight. Further, it is preferred to conduct heating and drying, for instance, at a temperature of 200° C. for two minutes, after the application of the aqueous boric acid solution, to remove the water.

Figure 2:
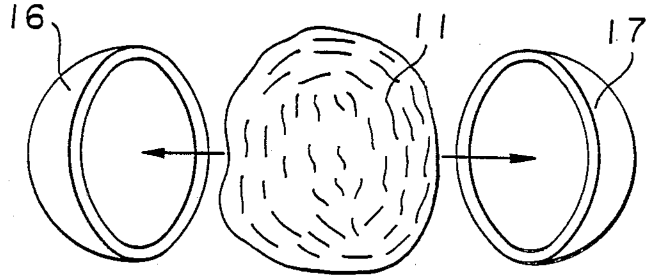
FIG. 2 is a perspective view illustrating a step of filling glass fibers in a mold.

Having thus applied the aqueous boric acid solution to the glass fibers 11, a predetermined amount of the glass fibers 11 is rounded and filled in a mold indicated at 16 and 17, as shown in FIG. 2. The density of the glass fibers 11 is preferably adjusted to a level of from 170 to 270 kg/$m^3$. If the density is less than 170 kg/$m^3$, no adequate compression strength is obtainable, and the volume tends to be too large to maintain the glass weight to the impregnated radioactive wast liquid at a proper level, whereby a heat-melting furnace of a large size will be required. On the other hand, if the density exceeds 280 kg/$m^3$, the cartridge tends to be susceptible to cracking as a whole, whereby no adequate falling strength will be obtained, and the water absorbing property tends to be poor since the spaces between the glass fibers decrease correspondingly.

After filling the glass fibers 11 into the mold 16 and 17, the mold is heated at a temperature of 710°±15° C. for 35±5 minutes, whereby the glass fibers 11 are partially fused. If the heating temperature is lower than 695° C., or the heating time is shorter than 30 minutes, the fusion of the glass fibers 11 tends to be inadequate, and the moldability tends to be poor. On the other hand, if the heating temperature is higher than 725° C. or the heating time is longer than 40 minutes, the glass fibers 11 are likely to melt and contracted, whereby the water absorbing property will be poor, and the products will be susceptible to cracking. By this heating treatment, boric acid ($H_3BO_3$) applied to the glass fibers 11 is converted to $B_2O_3$, and $B_2O_3$ is melted and coated on the glass fibers 11, whereby an adhesive effect and a coating film-forming effect will be brought about. Further, $B_2O_3$ is a component constituting the glass fibers 11, and thus will not adversely affect the performance of the finally obtained cartridge for the disposal of a radioactive waste liquid.

Figure 3:
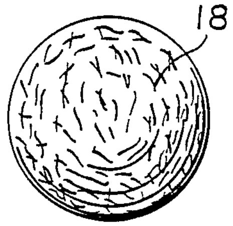
FIG. 3 is a perspective view illustrating a molded cartridge.

After this heat treatment, the mold 16 and 17 is left to cool, and then the glass fibers 11 are taken out to obtain a cartridge 18 as shown in FIG. 3. In this embodiment, the cartridge 18 is of a spherical shape. However, the cartridge may be of a cylinderical shape or of a shape of an angular rod or the like. A cartridge 18 of a spherical shape has the following advantages. Namely, (1) when dumped, the cartridges readily roll, and the frictional resistance is adequately small, whereby the dumping operation can smoothly be conducted, and an automatic operation can readily be accomplished for the waste liquid treatment, (2) clogging scarcely takes place in the dumping installation, and the cartridges are not susceptible to cracking or breakage, whereby the generation of a dust will be minimized, and (3) the cartridges can uniformly be packed, and the heat-melting can be uniformly conducted for the treatment of the radioactive waste liquid.

In the present invention, it is preferred that an aqueous boric acid solution is applied by e.g. a spray again to the cartridge 18 thus obtained, followed by heating and drying at a temperature of at least 300° C. By the heating at a temperature of at least 300° C., boric acid ($H_3BO_3$) is converted to $B_2O_3$. *Thus, the generation of a dust can effectively be prevented.*

The cartridge obtained in the manner as described above, was compared in its performance with a cartridge obtained without conducting the treatment with the aqueous boric acid solution. The results are shown below.

| | (Boric acid treatment) | (Non-treatment) |
|---|---|---|
| Compression strength (Deformation degree) | 2 mm | 5 mm |
| Deviation in Compression strength | 0.3 mm | 0.6 mm |
| Amount of dust | Small | Substantial |
| Penetration of waste liquid | Satisfactory | Satisfactory |

Thus, with the cartridge of the present invention treated with boric acid, the strength is high, and the amount of the dust generated, is small.

In the above Example, an aqueous boric acid solution was employed. However, it has been found that similar effects are obtainable by using silicic acid, lithium borate, lithium silicate, zinc borate, zinc silicate, an organic silane, an oil emulsion or an alumina sol.

As dscribed in the foregoing, according to the present invention by the application of at least one member selected from the group consisting of boric acid, silicic acid, lithium borate, lithium silicate, zinc borate, zinc silicate, an organic silane, an oil emulsion and an alumina sol, to the glass fibers, such an organic acid, organic salt or organic substance provides an adhesive effect or a coating film-forming effect, whereby the compression strength and the impact strength of the cartridge will be improved. As a result, the amount of a dust generated, decreases, and it is possible to prevent troubles caused by the dust.

We claim:

1. A process for preparing a cartridge for disposal of a radioactive waste liquid, which comprises filling glass fibers in a mold, heat-treating the fibers for partial fusion and molding them into a molded product of a predetermined shape, wherein at least one member selected from the group consisting of boric acid, silicic acid, lithium borate, lithium silicate, zinc borate, zinc silicate, an organic silane, a silica sol, an oil emulsion, and an alumina sol, is applied to the glass fibers or to the molded product.

2. The process according to claim 1, wherein at least one member selected from the group consisting of aqueous solutions of boric acid, silicic acid, lithium borate, lithium silicate, zinc borate and zinc silicate, an organic silane, an oil emulsion, and an alumina sol, is impregnated to the glass fibers or to the molded product, followed by drying.

3. The process according to claim 1, wherein said at least one member is applied in an amount of from 0.01 to 2% by weight as solid content relative to the glass fibers.

4. The process according to claim 1, wherein the organic silane is a $\gamma$-alkylaminotriethoxysilane, and the oil emulsion is an emulsified mineral oil.

5. The process according to claim 1, wherein the glass fibers are composed essentially of 50 to 75% by weight of $SiO_2$, 0 to 15% by weight of $B_2O_3$, from 0 to 10% by weight of $Li_2O$, from 0 to 10% by weight of BaO, from 0 to 25% by weight of CaO, from 0 to 10% by weight of ZnO and from 0 to 15% by weight of Alhd $2O_3$.

6. The process according to claim 5, wherein boric acid, silicic acid, lithium borate, lithium silicate, zinc borate, zinc silicate, an alumina sol or a mixture thereof is applied to bring the final composition of the molded product to be 55 to 65% by weight of $SiO_2$, 2 to 6% by weight of $B_2O_3$, from 2 to 6% by weight of $Li_2O$, from 0 to 6% by weight of BaO, from 2 to 6% by weight of CaO, from 2 to 6% by weight of ZnO and from 2 to 8% by weight of $Al_2O_3$.

7. The process according to claim 1, wherein the organic silane or the oil emulsion is applied in an amount of from 0.001 to 1% by weight, relative to the glass fibers.

8. The process according to claim 1, wherein the glass fibers have an average diameter of from 8 to 18 μm.

* * * * *